United States Patent [19]
Javitt

[11] Patent Number: 6,070,057
[45] Date of Patent: May 30, 2000

[54] SYSTEM AND METHOD FOR IMPROVING RELIABILITY AND PERFORMANCE OF WIRELESS COMMUNICATION SYSTEMS USING MESSAGE POOLING

[75] Inventor: Joel I. Javitt, Hillside, N.J.

[73] Assignee: NCR Corporation, Dayton, Ohio

[21] Appl. No.: 09/378,057

[22] Filed: Aug. 20, 1999

Related U.S. Application Data

[62] Division of application No. 08/681,545, Jul. 23, 1996.

[51] Int. Cl.$^7$ .................................................... H04B 17/00
[52] U.S. Cl. ....................................... 455/67.3; 455/226.3
[58] Field of Search .................................. 455/67.1, 67.3, 455/63, 226.1, 226.3, 59, 67.7, 66, 226.4; 340/825.17

[56] References Cited

U.S. PATENT DOCUMENTS

| | | |
|---|---|---|
| 4,075,632 | 2/1978 | Baldwin et al. . |
| 4,697,281 | 9/1987 | O'Sullivan . |
| 4,739,328 | 4/1988 | Koelle et al. . |
| 4,786,907 | 11/1988 | Koelle . |
| 4,888,767 | 12/1989 | Furuya et al. . |
| 4,905,234 | 2/1990 | Childress et al. . |
| 5,450,612 | 9/1995 | Chanroo et al. . |
| 5,465,405 | 11/1995 | Baseghi et al. . |
| 5,504,475 | 4/1996 | Houdou et al. . |
| 5,604,923 | 2/1997 | Wilkus . |
| 5,722,048 | 2/1998 | Javitt . |
| 5,805,977 | 9/1998 | Hill et al. . |

FOREIGN PATENT DOCUMENTS

| | | |
|---|---|---|
| 9206454 | 4/1992 | WIPO . |
| 9411832 | 5/1994 | WIPO . |

OTHER PUBLICATIONS

Co-pending Application Serial No. 08/681,545; entitled "Apparatus for Improving the Signal to Noise Ratio in Wireless Communication Systems through Message Pooling and Method of Using the Same", invented by Javitt, filed Jul. 23, 1996, allowed May 24, 1999, Attorney Docket No. 6129.10, assigned to NCR Corporation.

Co-pending Application Serial No. 08/348,526; entitled "Apparatus for Improving the Signal to Noise Ratio in Wireless Communication Systems through Message Pooling and Method of Using the Same", invented by Javitt, filed Dec. 2, 1994, issued Feb. 24, 1998 as U.S. Patent No. 5,722,048, Attorney Docket No. 6129.00, assigned to NCR Corporation.

Co-pending Application Serial No. 08/923,809; entitled "Apparatus for Improving the Signal to Noise Ratio in Wireless Communication Systems through Message Pooling and Method of Using the Same", invented by Javitt, filed Sep. 4, 1997, Attorney Docket No. 6129.01, assigned to NCR Corporation.

(List continued on next page.)

*Primary Examiner*—Nguyen Vo
*Attorney, Agent, or Firm*—Charlene Stukenborg

[57] ABSTRACT

A system and method for improving the reliability and performance of wireless communication systems having low signal to noise ratios using intelligent retransmissions of the communication signals and statistical detection or demodulation of signal and background noise levels. Using a combination of hardware, software and a communications protocol in a packet data communication system, a wireless communication system, such as for an electronic display system, adapts communication techniques to meet customer based accuracy requirements independent of changes in the signal to noise ratio of the communication channel.

4 Claims, 6 Drawing Sheets

OTHER PUBLICATIONS

Co-pending Application Serial No. 08/923,806; entitled "Apparatus for Improving the Signal to Noise Ratio in Wireless Communication Systems through Message Pooling and Method of Using the Same", invented by Javitt, filed Sep. 4, 1997, allowed Jul. 19, 1999, Attorney Docket No. 6129.02, assigned to NCR Corporation.

Co-pending Application Serial No. 08/923,792; entitled "Apparatus for Improving the Signal to Noise Ratio in Wireless Communication Systems through Message Pooling and Method of Using the Same", invented by Javitt, filed Sep. 4, 1997, Attorney Docket No. 6129.03, assigned to NCR Corporation.

Co-pending Application Serial No. 08/534,808; entitled "Apparatus for Providing Wireless Transmission of Information in Electronic Display Systems and Method of Using the Same", invented by Chang et al., filed Sep. 25, 1995, Attorney Docket No. 6040, assigned to NCR Corporation.

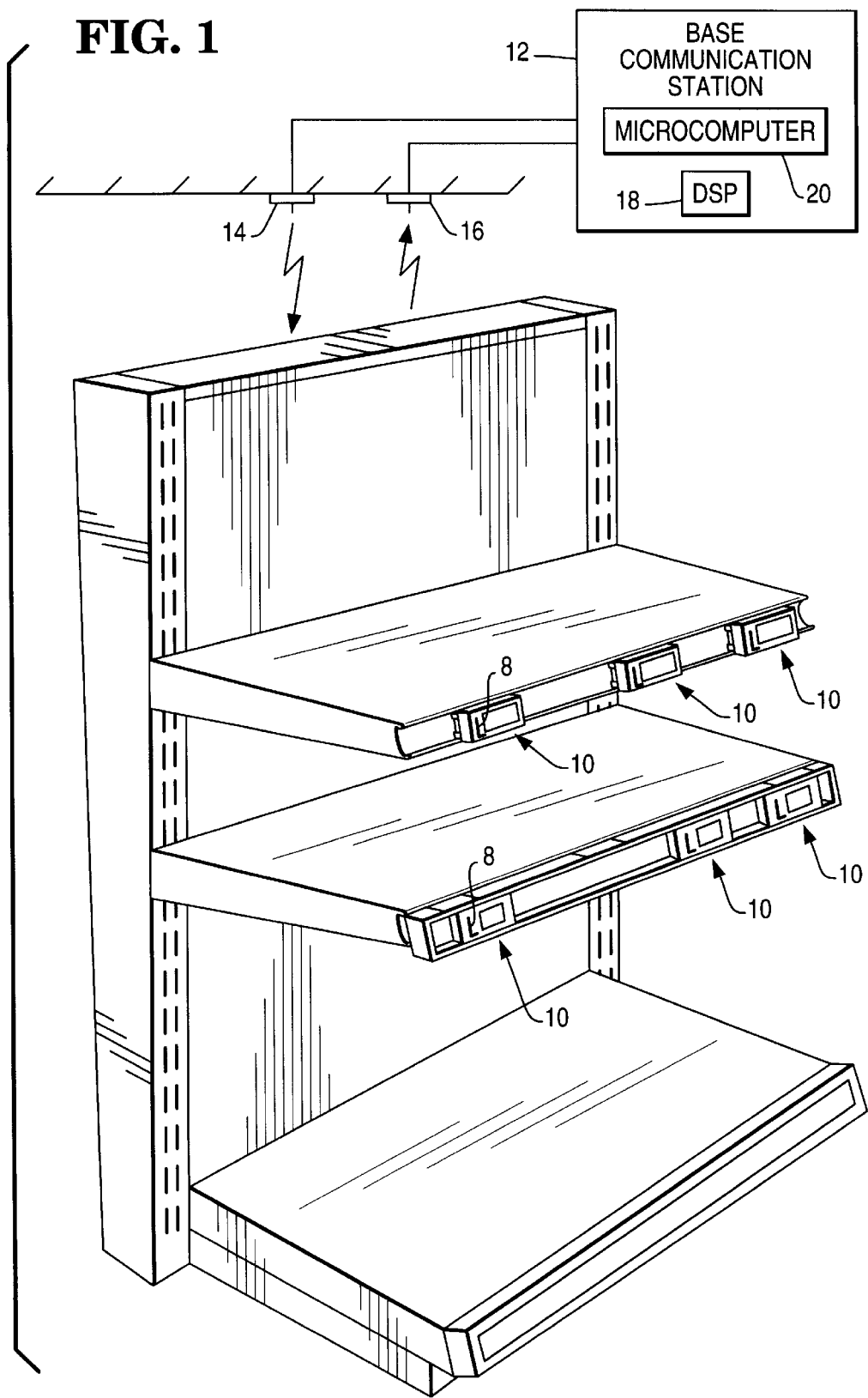

FIG. 2A

Pooled Downlink Protocol Message Transmission and Acknowledgment Chart

Time generally advances from top to bottom and left to right
Notation used:
Mxx Message named xx is transmitted to a particular display unit but not received
Rxx Message named xx is transmitted and received by a particular display unit
Dxx Message named xx is sent and its receipt does not matter
Uxx Display unit is acknowledging message xx
S# Superframe broadcast TOD=#

NOTE: Different messages are being received and acknowledged by different display units NOTE: only time slots 1, 4, & 10 are shown for brevity uplinks last 3 slots

| | TOD | 2 | 2 | 2 | 3 | 3 | 3 | 4 | 4 | 4 | 5 | 5 | 5 | 6 | 6 | 6 | 7 | 7 | 7 | 8 | 8 | 8 | 9 | 9 |
|---|---|---|---|---|---|---|---|---|---|---|---|---|---|---|---|---|---|---|---|---|---|---|---|---|
| | Time Slot | 1 | 4 | 7 | 10 | 1 | 4 | 7 | 10 | 1 | 4 | 7 | 10 | 1 | 4 | 7 | 10 | 1 | 4 | 7 | 10 | 1 | 4 | 7 | 10 | 1 | 4 |
| BATCH SIZE 4 | FRAME | | | | | | | | | | | | | | | | | | | | | | | |
| 1 | 0 | S2 | S2 | S2 | | S3 | U2F | S3 | S3 | U3F | S4 | S4 | UCF | S5 | S5 | S5 | S6 | U5F | S6 | S6 | S7 | S7 | S7 | | S8 | S8 | S8 | | S9 | |
| 4 | 1 | R21 | RB1 | R31 | | RC1 | M41 | RD1 | R51 | M52 | RE1 | R61 | RF1 | R71 | | R81 | | R91 |
| 1 | 2 | M22 | U21 | RB2 | UB1 | M22 | U31 | DB2 | UC1 | R22 | DB2 | UD1 | M52 | U51 | UE1 | M52 | U61 | UF1 | R52 | U71 | D52 | U81 | U52 |
| 4 | 3 | R23 | | U23 | | R33 | | | | R43 | U22 | | UB2 | R53 | U22 | UB2 | R63 | U22 | UB2 | R73 | U22 | UB2 | U52 |
| 1 | 4 | | U23 | | | | U33 | | | U43 | | U53 | | | U63 | | | U73 |
| 4 | 5 | | | | | | | | | | | | | | | | | | | | | | | |
| 1 | 6 | | | | | | | | | | | | | | | | | | | | | | | |
| 4 | 7 | | | | | | | | | | | | | | | | | | | | | | | |
| 1 | 8 | | | | | | | | | | | | | | | | | | | | | | | |
| 4 | 9 | | | | | | | | | | | | | | | | | | | | | | | |
| 1 | 10 | | | | | | | | | | | | | | | | | | | | | | | |
| 4 | 11 | | | | | | | | | | | | | | | | | | | | | | | |
| 1 | 12 | | | | | | | | | | | | | | | | | | | | | | | |
| 4 | 13 | | | | | | | | | | | | | | | | | | | | | | | |
| 1 | 14 | | | | | | | | | | | | | | | | | | | | | | | |
| 4 | 15 | R2F | RBF | R3F | | RCF | M4F | R5F | | | | | | | | | | |
| | ... | MOD (TOD, BATCH NUM)=0 then if acknowledgment waiting acknowledge else continue current status |

| | | | B1 | | C1 | | D1 | | E1 | | F1 | | | | |
|---|---|---|---|---|---|---|---|---|---|---|---|---|---|---|---|
| | 21 | | B2 | 31 | B2 | 22 | B2 | 51 | 61 | 71 | | 81 | | 91 | |
| | 23 | | | 33 | | 43 | | 53 | 63 | 52 | | 52 | | | |
| | | | | | | | | | | 73 | | | | | |

Acknowledgments waiting for next batch

| 1 | 2 | 3 | 4 | 5 | 6 | 7 | 8 | 9 | 10 | 11 | 12 | 13 | 14 | 15 |
| 1 | 4 | 1 | 4 | 1 | 4 | 1 | 4 | 1 | 4 | 1 | 4 | 1 | 4 | 1 |
| 2F | BF | 3F | CF | | | | | 5F | | | | | | |

SYSTEM AND METHOD FOR IMPROVING RELIABILITY AND PERFORMANCE OF WIRELESS COMMUNICATION SYSTEMS USING MESSAGE POOLING

This is a divisional of U.S. patent application Ser. No. 08/681,545 filed on July 23, 1996, allowed.

BACKGROUND OF THE INVENTION

The present invention relates generally to a new and novel system and method for improving the reliability and performance of wireless communication systems using message pooling and statistical analysis of received signals and background noise. Improving the reliability and performance by the present system and method allows system operation in an environment in which signal to noise ratios are lower than the generally required level for determining if a transmission was received. More particularly, the present invention relates to improving the signal to noise ratio of wireless communication systems in conjunction with electronic display systems or other systems having a base station and satellite devices.

Large retail stores often deal with several tens of thousands of different kinds of products. In such stores, much attention is paid to the management and control of the inventory of products and the displaying and labeling of the prices of the products being sold. Mistakes as to the labeling of the prices of products could cause dissatisfaction to customers and damage the reputation of the store.

Therefore, it is desirable to correctly identify the rices of products and minimize the number of pricing errors. Accordingly, electronic display systems having multiple electronic display units have been developed. Such electronic display systems are typically arranged such that light-weight, compact electronic display units which display the product's price, along with other product information, are place on display shelves or showcases in front of the products. These types of electronic display systems typically allow the prices of products displayed in the electronic display portions of the electronic display units to be changed when the prices are raised or lowered and/or when the arrangement of products displayed on the display shelves or showcases are changed.

In such electronic display systems, it becomes possible to reliably identify the correct prices of products since changes in the prices of products displayed on the electronic display portions of the electronic display units are controlled and managed by a base communication system or some other processing control unit. When these electronic display systems use wireless communication, the system must reliably operate over wide ranges of path loss and noise levels. This reliable operation is typically accomplished by designing wireless communication systems for the worst case operating scenario, often resulting in additional cost. There is a need for a system and method for transmitting and receiving signals in wireless communication systems using message pooling which can enable a less expensive system to operate over wide ranges of path loss and noise level while yielding reliable results.

SUMMARY OF THE INVENTION

The present invention provides a system and method for transmitting and receiving signals in a wireless communication system having low signal to noise ratios which are improved using intelligent retransmissions of the communication signals and statistical analysis of detected or demodulated signal and background noise. Using a combination of hardware, software and a communications protocol in a packet data communication system, the invention enables a wireless communication system, such as for an electronic display system, to adapt communication techniques to meet customer based accuracy (or certainty) requirements independent of changes in the signal to noise ratio of the communication channel.

Accordingly, an object of the present invention is to provide a system and method for transmitting and receiving signals in wireless communication systems which improves the signal to noise ratio using message pooling.

Another object of the present invention is the provision of a system and method for improving the reliability and performance of wireless communication using message pooling, particularly in conjunction with wireless communication systems having unbalanced links, such as electronic display systems or other systems having one relatively expensive or complex base station and many less expensive or less complex satellites.

Yet another object of the present invention is to provide a system and method using a unique application of statistical detection or demodulation of signal and background noise levels to determine if a message has been received by a display unit.

Still another object of the present invention is to provide a communication system which enables cheaper satellite stations with limited power capabilities to communicate with a base station.

Other objects, advantages and novel features of the present invention will become apparent in the following detailed description of the invention when considered in conjunction with the accompanying drawings.

BRIEF DESCRIPTION OF THE DRAWINGS

FIG. 1 is a perspective view of a typical electronic display system for use with the system and method of the present invention.

FIG. 2A is a left side portion of a table showing examples of message pooling in accordance with a preferred embodiment of the present invention.

FIG. 2B is a right side portion of a table showing examples of message pooling in accordance with a preferred embodiment of the present invention.

FIG. 3 is a table showing examples of acknowledgments pending corresponding to the examples of FIG. 2A.

DETAILED DESCRIPTION OF THE INVENTION

Figure 4:
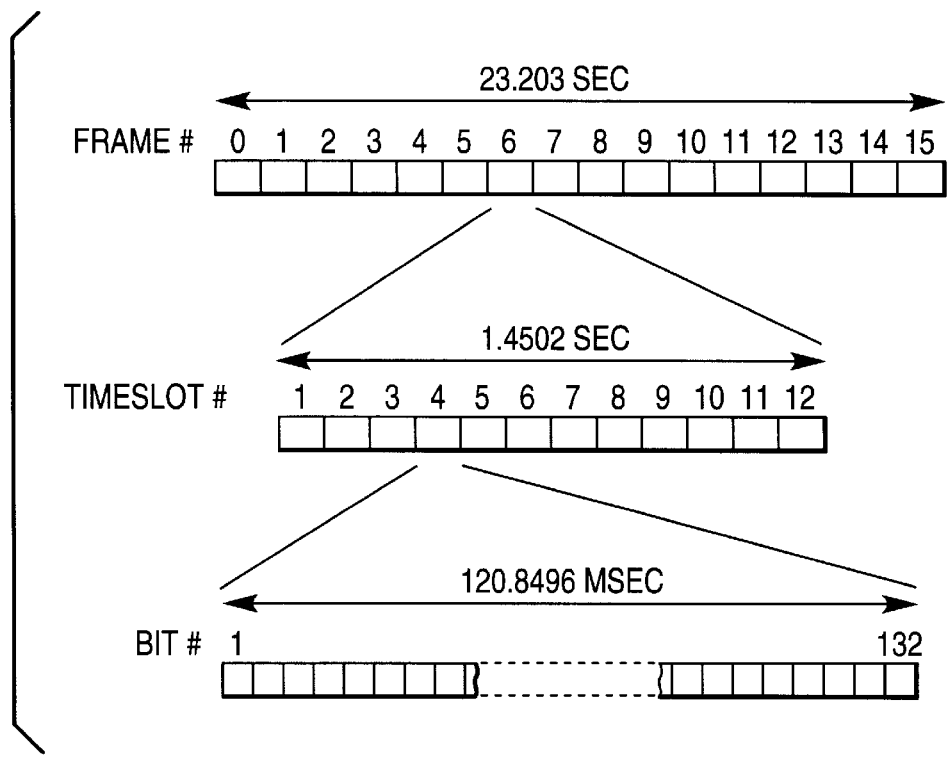
FIG. 4 is an expanded block diagram showing the relationship of frames, times slots and bits similar to those shown in FIGS. 2A and 2B.

Referring to FIG. 1, the electronic display system includes a plurality of electronic display units 10 and a base communication station 12. Base communication station 12 includes a transmitter 14 and a homodyne receiver 16. Base communication station 12 includes at least one antenna for transmitting and receiving signals, but may include additional antennas and means to enable selection of one or a combination of one or more antennas. Base communication station 12 also includes a microcomputer 20 and a digital signal processor 18. Display units 10 may be any known type of electronic shelf display unit for use in a wireless system, having at least minimal memory, control, and processing capabilities. Display units 10 preferably include an RF antenna 8. Display units 10 preferably have capability for displaying various product information initially entered and stored in base communication station 12.

In operation, base communication station 12 transmits signals to electronic display unit 10 using transmitter 14. The signals sent to each display unit 10 comprise a group of repeated identical messages (referred to as a batch in the detailed description hereinbelow of message pooling). These signals also may include information on the number of repeated messages sent in the group and when and how the display unit 10 should send an acknowledgment signal back to the base communication station 12. These signals also include an address which indicates which particular display unit 10 is the intended recipient. Alternatively, the system preferably has an established communication protocol in which the display unit 10 knows the information associated with the acknowledgment signal.

Next, the display unit 10 confirms receipt of the signal by generating an acknowledgment signal. In a preferred system of using the present invention, electronic display units 10 use modulated back scatter techniques and confirmation is performed by having the unit modulate the signal reflected by the antenna 8 at a particular frequency. The modulated back scatter techniques include each display unit having a means for reflecting the signal back to the antenna modulated at a specified frequency. Examples of implementing a communication system using modulated backscatter are described in the following references (incorporated by reference): U.S. Pat. No. 4,075,632 issued Feb. 21, 1978 inventors H. W. Baldwin et al.; U.S. Pat. No. 4,739,328 issued Apr. 19, 1988 inventors A. R. Koelle et al.; and U.S. Pat. No. 4,786,907 issued Nov. 22, 1988 inventors A. R. Koelle et al. Thus, each electronic display unit 10 may respond by passive techniques and need not include a radio frequency source. The display unit 10 returns an acknowledgment signal for all sent messages even if less than all messages are received due to multi-path fading or bit errors or the like.

The base communication station 12 then receives the acknowledgment signals from display units 10. The base communication station 12 records the strength of the acknowledgment signals for each transmission as determined using the digital signal processor. Then, the base communication station 12, using a unique application of statistical techniques, determines if the message has been received by the display unit 10. Microcomputer 20 contains the processing and memory capabilities to perform these tasks. The base communication station 12 measures the energy level present in the appropriate frequency and time period, as determined by the communication technique used. This measurement is called the signal level. Typically, when electronic display units 10 generate a signal in a multipath transmission environment, the signal level has significant random variations from one measurement reading to the next. The receiver 16 also receives and the communication station 12 measures the energy present at other frequencies and time periods. This measurement is called the noise level. The noise level may also have a significant random variation from one measurement to another. Base communication station 12 decides if the signal level is sufficiently high to conclude with the desired confidence level that it could not be caused by noise and therefore must have been caused by electronic display unit 10 acknowledging the sent message (s).

This decision to be made by the base communication station 12 is treated as a unique example of a statistical inference problem which is generally solved using the known process of hypothesis testing, as described hereinbelow. The process of hypothesis testing has both null hypothesis and alternative hypothesis components. The null hypothesis is accepted when the signal level does not significantly differ from the population of noise levels, for example only, such as less than 2 dB greater than the noise level. The alternative hypothesis is accepted when the signal level is greater than the noise level with a specified level of confidence.

A hypothesis test is constructed by determining a threshold that the signal level must exceed to reject the null hypothesis. Because the noise level has significant random variation (due to operation in a multipath transmission environment), rejecting the null hypothesis with a high degree of confidence will require that the signal level be large. If multiple independent measurements of the signal level are made and the statistical parameters of the sample are compared with the expected results from an equal size population of noise, the expected variation in a population of noise will be lower than for an individual sample. The law of large numbers states that as the size of a sample increases, the variability will decrease. Since the variability has decreased, the signal level necessary to reject the null hypothesis has decreased as well.

Applying this process to an electronic display system in accordance with the present invention, if base communication station 12 sends multiple identical messages to electronic display unit 10 and receives multiple acknowledgments, the signal level of each acknowledgment can be combined into one statistic. The threshold for concluding that the message was received is now reduced as the sample size increases. By using this process of acceptance, base communication station 12 can detect acknowledgments from otherwise undetectably weak electronic display units 10. The system and method of the present invention determines the optimal number of messages to transmit to each individual display unit 10 depending on the signal strength or weakness of individual signals received and also the importance of the message sent.

The above described process is repeated for each display unit 10 and for each batch of messages to be sent. Additionally, to compensate for long term shadowing of electronic display units, if an electronic display unit 10 does not generate an acknowledgment signal as determined by the base communication station 12 using the process described above, the base communication station 12 will repeat the transmission several hours later or at any other desired predetermined interval.

Now that the basic overview of the system and method has been provided, a more detailed discussion of message pooling is presented. To assist in this detailed discussion, a precise definition for the following terms is provided. The terms are defined as they relate to an established preferred protocol for communicating with the display units 10; however the message pooling of the present invention may be used with other systems for communicating with the display units 10.

Downlinks—Signals sent by base communication station 12 to display units 10. Downlink messages can include bed check, price update, load memory, change electronic display unit identification number or change display register.

Uplinks—Signals sent by display units 10 to base communication station 12. (Acknowledgments—one sent for each downlink burst or message addressed to display unit 10.)

Pooling Uplinks—Grouping the acknowledgments together as described above to reduce the required threshold.

Pooling Downlinks—Grouping received downlink messages in electronic display unit 10 such that if one message in a group of N is received, N acknowledgments are transmitted. The timing of the N acknowledgments is independent of which message is actually received.

Communication Attempt—A group of identical messages which are sent to electronic display unit 10 and their associated uplinks which are evaluated to determine if electronic display unit 10 has received at least one of the messages.

Downlink Batch Size—The number of downlinks pooled by electronic display unit 10.

Small Batch—The smaller of the two downlink batch sizes in a particular system at a particular time.

Large Batch—The larger of the two downlink batch sizes in a particular system at a particular time.

Uplink Batch Size—The number of uplinks pooled for a given communication attempt. This may contain one or more downlink batches.

Downlink Success Rate (DSR)—A particular electronic display unit's fraction of downlink messages that it receives, assuming that it is not blocked by some unusual circumstance, for example, being blocked by a pallet of cans in the aisle. (This is a measure of the system's performance and robustness.)

Batch Success Rate (BSR)—The fraction of Downlink Batches for a particular electronic display unit that has one successful message delivered and therefore generates acknowledgments. This also varies based on the downlink batch size.

Message Success Rate (MSR)—The fraction of messages for a particular electronic display unit that is received by the electronic display unit and has a sufficiently strong acknowledgment for the base communication station to conclude that the message was received. This varies based on downlink and uplink batch sizes.

Signal Level—A numerical value computed by digital signal processor 18 as a measurement of the energy detected in a narrow band corresponding to the frequency at which a particular electronic display unit is expected to generate an acknowledgment signal.

Noise Level—A numerical value computed by digital signal processor 18 as a measurement of the energy detected in a narrow band that is similar to the band containing the acknowledgment but at a different frequency and therefore not materially affected by any electronic display unit's acknowledgment.

Signal Noise—The signal level for frames in which no acknowledgments were expected.

The discussion of the message pooling of the present invention is broken down into three parts. The first part presents the protocol used to pool downlink messages transmitted to display unit 10, including the use of the preferred communications protocol. The second part presents the statistical procedures and algorithms used by the base communication station 12 to implement the necessary hypothesis tests or to estimate the appropriate pool size for communicating with a particular electronic display unit 10. The third part then overviews the communication process with pooling and the data storage capabilities to support it.

Figure 2B:
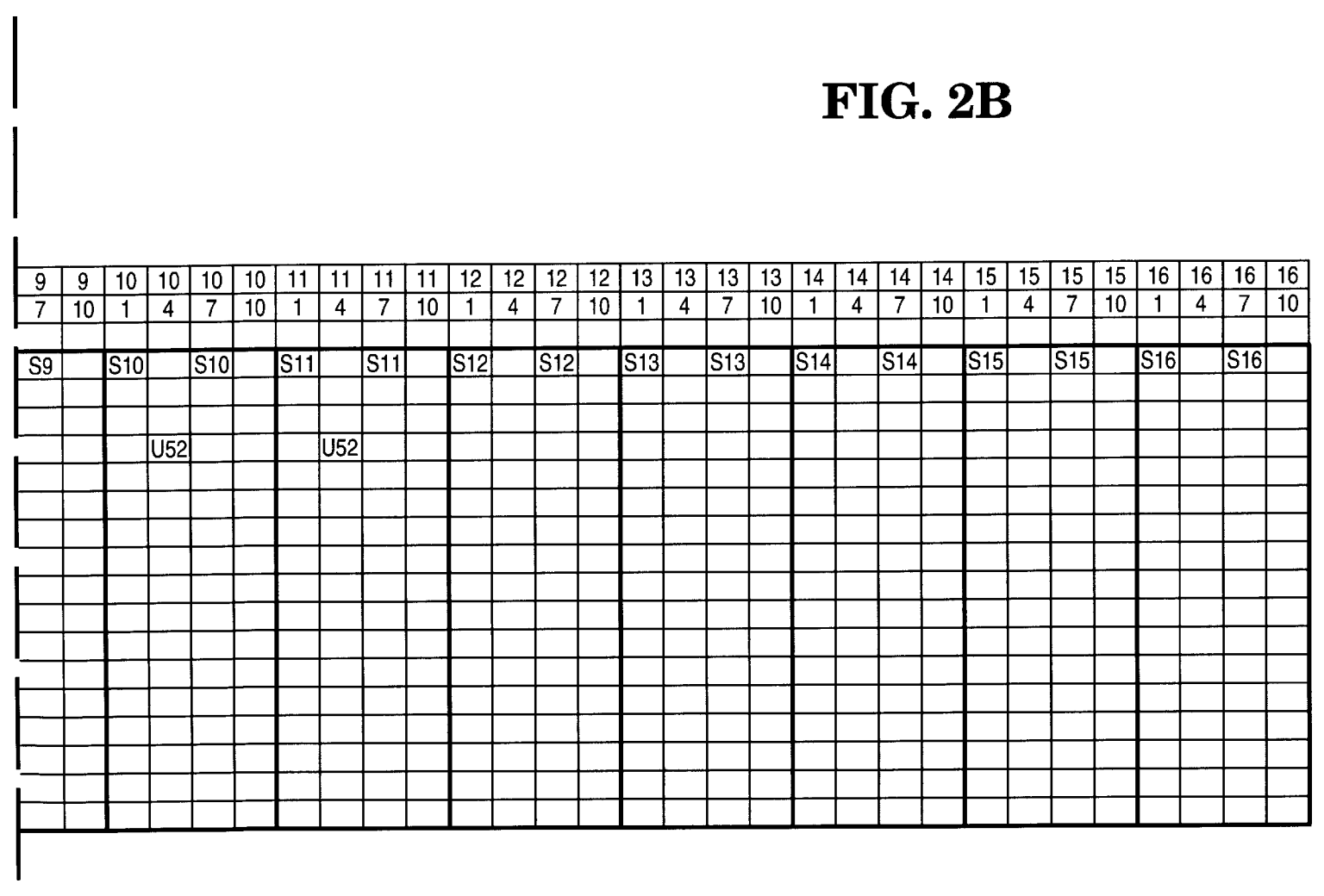

The first step of the method of the present invention includes implementing pooling of messages. This discussion will begin with implementation of downlink pooling and then describe uplink pooling according to the present invention. Downlink pooling involves the transmitting of repeated messages to a specified display unit 10. To implement downlink pooling, either each message itself or an established communications protocol is used so the specified display unit 10 knows when to start to send the acknowledgment signal and how large the batch size (number of messages sent) is. Because the communication bandwidth and electronic display unit processing power are typically limited, it is preferable to use an established communication protocol which allows the display unit 10 to determine easily when to acknowledge the transmitted messages without adding additional information to each message. FIGS. 2A, 2B and 3 are charts demonstrating message transmission and acknowledgment according to a preferred established communication protocol.

An established communication protocol, to be used in implementing downlink pooling, takes advantage of preexisting synchronized timing information known to both the base communication unit 12 and to all electronic display units 10. This information preferably includes a frame number which determines which frame within a group of 16 frames (a superframe) is currently being used and a time of day (TOD) code which counts the number of super frames (modulo $2^{16}$) that have occurred since the electronic display system was last initialized. (See FIG. 4.) This information is preferably transmitted to each electronic display unit 10 through a system identification burst. The time of day (TOD) code is transmitted in the system identification burst and the system identification burst itself is preferably transmitted in frame 0, as indicated by S# in FIGS. 2A and 2B. Therefore, the receipt of the system identification burst conveys the frame number to the electronic display unit 10. Since all electronic display units 10 must correctly receive at least one system identification burst before achieving synchronization and being enabled for communication, all electronic display units 10 and base communication station 12 will have the same value for the frame number and the time of day (TOD) code.

To achieve initial synchronization, electronic display unit 10 should follow this procedure:

1. Acquire bit synchronization;
2. Time-slot alignment to any down-link time-slot;
3. Verify burst synchronization;
4. Acquire de-scramble synchronization;
5. Wait for a change the electronic display unit identification address message;
6. Jump to the assigned time-slot; and
7. Acquire de-scramble synchronization again.

During this period of time, each electronic display unit 10 is waiting for a change the electronic display unit identification address message with its assigned electronic display unit identification address. If such a message is not received by particular electronic display units 10 within one hour, this indicates that the particular electronic display units 10 are in a time-slot which is not being used by the store. These particular electronic display units 10 should then jump to the other time-slot and again wait for an electronic display unit identification address message with its assigned electronic display unit identification address.

Electronic display unit 10 should follow this procedure to achieve re-synchronization:

1. Acquire bit synchronization;
2. Time-slot alignment to any down-link time-slot;
3. Verify burst synchronization;
4. Acquire de-scramble synchronization;
5. Jump to the assigned time-slot; and
6. Acquire de-scramble synchronization again.

Figure 5:
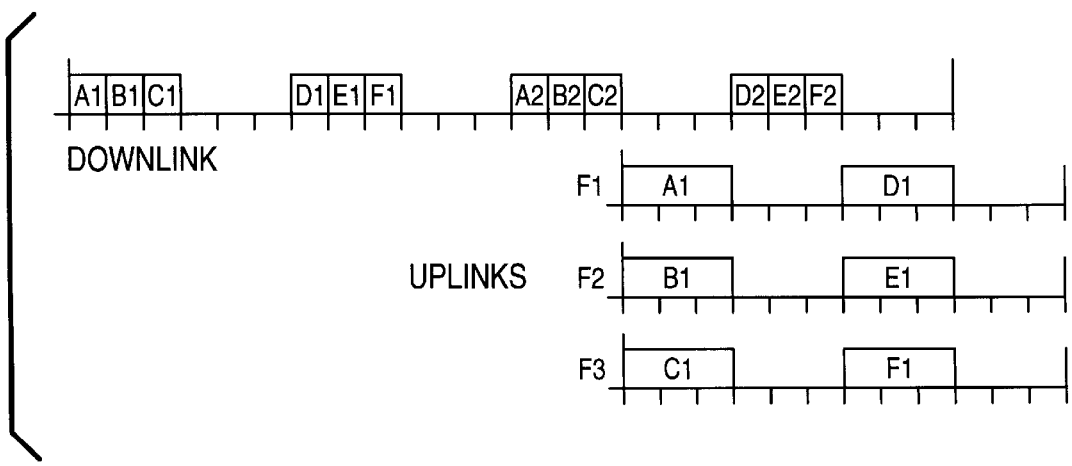
FIG. 5 is an expanded block diagram showing downlinks and uplinks similar to those shown in FIGS. 2A and 2B.

After electronic display unit 10 acquired the first de-scramble synchronization, electronic display unit 10 should have the correct time-slot # since acquiring the descramble synchronization generally indicates successful receipt of system information, and the system information has its time-slot #. Thus, electronic display unit 10 can jump to the assigned time-slot immediately after acquiring the first descramble synchronization. Since electronic display units 10 should previously have been assigned time-slot #'s, this is not an initial synchronization. In the preferred communication protocol, the down-link and up-link frames are skewed. As seen in FIG. 5 showing an example of a store using 6 time-slots and 3 up-link channels, the up-link frame is 15 time-slots behind the down-link frames.

The preferred established communication protocol uses the following parameters:

Batch sizes will be powers of 2 (i.e. 1, 2, 4, 8 or 16).

All the messages in a batch will be sent in the same frame and time slot of successive super frames (i.e., successive time of day (TOD) code values).

The first downlink in a batch will be sent when the time of day (TOD) code modulo batch size is 1. Therefore, the last will be sent when time of day (TOD) code modulo batch size is 0.

The first acknowledgment will be enabled immediately after the last downlink interval for the batch and will occur in the associated uplink time slot of the next frame. Uplinks preferably last three time slots.

Frames will have a batch size associated with them which is rarely changed. The odd frames will have one size (small batch) and the even frames will have another (large batch).

The size of the small batch and the large batch will be communicated to all of the display units in the system identification burst.

There are preferably 12 time slots associated within each frame. There are preferably 16 frames in each superframe. (See FIG. 4). TOD codes are limited only by the 16 bits allocated according to a preferred communication protocol. As mentioned previously, other communication protocols with other parameters can also be used with the present invention.

The preferred communication protocol enables data to be transmitted to the following types of electronic display unit registers: multiple display registers, identification code (store specific), serial number (set at factory), assigned time slot, stack, frame count, random number generator, present time slot, store identification number, divisor for audio tone generator, system time, blink count, pointer for promotion, event time (time to change display), new register, swap register, register number, error counter, synchronization counter, system information error counter, burst buffer, liquid crystal display counter, error status, flags, temporary registers, batch size, pooled down-link, etc.

Down-link bursts may include guard band partitions (to protect against turn-on transients and stabilization delays), address partitions, command partitions, synchronization partitions (may be constant), message information partitions and parity check partitions.

In a preferred embodiment of the present invention at any one time, a particular electronic display unit 10 will be in the process of receiving or acknowledging only one message. Therefore base communication station 12 will send one batch of messages to an electronic display unit 10 and wait for all acknowledgments before sending additional messages. For example, if base communication station 12 sends a batch of eight (8) messages to a particular electronic display unit 10 in frame 2 beginning at time of day (TOD) code 1, the next batch of messages to that particular electronic display unit 10 may not begin until time of day (TOD) code 17. Messages may not be sent to the same electronic display unit 10 in other frames either. (Refer to FIGS. 2A and 2B for additional examples of timing for transmitting and receiving messages.) Broadcast messages that are addressed to all electronic display units 10 and which expect no acknowledgment may be transmitted at this time. Once electronic display unit 10 receives a single downlink message, it will transmit all acknowledgments even if it loses synchronization.

The nominal up-link frequencies and channel numbers are defined in terms of the modulation subcarrier frequencies as follows (channel no., frequency, divisor): $F_0$, 29127.1 Hz, 2/9; $F_1$, 24576.0 Hz, 3/16; $F_2$, 23130.4 Hz, 3/17; and $F_3$, 20971.5 Hz, 4/25. These audio tones can be generated with a synthesizer based upon a frequency of 32,768*4=131,072 Hz.

The preferred established communication protocol supports two different downlink batch sizes simultaneously. These are referred to as small batch and large batch. The uplink batch sizes will generally be an integer multiple of the downlink batch size that either base communication station 12 selects or systems engineers enter as a parameter for a particular electronic display unit 10. This downlink batch size may be based on the strength or weakness of the signal from the particular display unit 10. Weakness can be due to physical distance or other interference. The electronic display system preferably uses one downlink batch size for odd frames and a different one for even frames and both sizes are broadcast to all electronic display units 10 in the system information burst. For simplicity, the small batch corresponds to the odd frames and the large batch corresponds to the even frames. (See FIGS. 2A and 2B.) It is also preferably an assumption that the size of the large batch and the small batch will not be changed very often.

If all electronic display units 10 in a given electronic display system do not have the same batch sizes, erratic performance, including false positive acknowledgments may result. Because the electronic display system implementing the preferred established communication protocol is somewhat complicated, it will take up to six minutes to assure that all electronic display units 10 have the same batch sizes.

In implementing the downlink pooling using the preferred established communication protocol, an optimal size for the downlink batches must be selected either by base communication station 12 performing processing or by systems engineers performing processing and then entering corresponding parameters. This selection will involve many tradeoffs and assumptions, but the following method has been found to produce acceptable results.

The optimal value for the large batch size will most likely be determined by the base communication station 12 using the downlink success rate (DSR) of the weakest electronic display units 10 so that even these electronic display units 10 have a batch success rate (BSR) of close to or exceeding 95%. Initially, the DSR of the weakest electronic display units 10 will be estimated by the base communication station 12 or systems engineers based on experience. A suggested initial batch size of 8 may be used.

As the electronic display system is tested, the downlink success rate (DSR) of individual electronic display units 10 can be measured by base communication station 12 using the techniques discussed below and the initial large batch size refined. The minimum batch sizes for various values of the downlink success rate (DSR) and batch success rate are shown in Table 1 below:

TABLE 1

Minimum Downlink Success Ratio (DSR)

| Downlink Batch Size | Batch Success of: | | |
|---|---|---|---|
| | 98.0% | 95.0% | 90.0% |
| 2 | 85.9% | 77.6% | 68.4% |
| 4 | 62.4% | 52.7% | 43.8% |
| 8 | 38.7% | 31.2% | 25.0% |
| 16 | 21.7% | 17.1% | 13.4% |

Note that if the uplink batch sizes contain several downlink batches, the batch success rate (BSR) is more critical, and the downlink batch size should then be increased. For downlink sizes greater than 1, it is likely that if one batch fails, the uplink batch also fails. Therefore, it is desirable for all downlink batches in an uplink batch to be successful. It is desirable that the rate for all batches in a communication attempt to be successful (excluding shadowing) given by the equation below be greater than about 85% for 95% of all electronic display units 10:

$$1 - \frac{Uplink\_Batch\_Size}{Downlink\_Batch\_Size} \times (1 - BSR) \geq 85\%$$

The small batch size is preferably chosen based on the following bounds. Initially, minimum small batch size should be the greater of 1 or the uplink batch size for the least critical messages on the strongest quartile of electronic display units 10. For any particular value of the small batch size, some portion of electronic display units 10 will require use of the large batch because of a downlink success rate (DSR) that is unacceptably low if the small batch is used. As the size of the small batch decreases, this portion increases. If the portion of electronic display units 10 that require the large batch exceeds the large batch capacity, the small batch size should be increased until this condition is eliminated. In initial determinations, the small batch size was set at 1.

The next step in implementing downlink pooling according to the present invention is to set the batch sizes in the electronic display units 10. The batch size for the odd and even frames is preferably conveyed to all electronic display units 10 in the system identification burst. Each batch size may be coded in one nibble using the code shown below in Table 2:

TABLE 2

| Value | Binary | | | |
|---|---|---|---|---|
| | b3 | b2 | b1 | b0 |
| 1 | 0 | 0 | 0 | 0 |
| 2 | 0 | 0 | 0 | 1 |
| 4 | 0 | 0 | 1 | 1 |
| 8 | 0 | 1 | 1 | 1 |
| 16 | 1 | 1 | 1 | 1 |

The codes above are stored by the electronic display unit 10 and can be used by the electronic display unit 10 to perform the modulus operation with minimal processing. Electronic display unit 10 uses the above codes and bit-wise ANDs them with the least significant nibbles of the time of day (TOD) code. The result is the time of day (TOD) code modulo and the batch size value.

When base communication station 12 is turned on and starts transmitting using the preferred communication protocol, all electronic display units 10 obtain the correct batch size before they acquire synchronization. If the batch size is modified while base communication station 12 is transmitting, care must be taken to avoid erratic operation and possible false positive acknowledgments during the transition period. The synchronization maintenance algorithm will cause electronic display unit 10 to lose synchronization if it does not receive 15 consecutive system information bursts, a process that takes less than six minutes. To change batch sizes in the preferred established protocol, the following steps should be followed:

1. Wait unit any time-critical messages have been sent.
2. Complete both downlinks and uplinks for all batches of communication that were started.
3. Change the desired data in the system information burst.
4. Transmit dummy messages.
5. Wait for 15 super frames, about 6 minutes.
6. Restart communication.

If the electronic display system has been turned off for several minutes, the batch sizes may be changed before the electronic display system is turned on again and no special care is required.

The actual transmission of a downlink batch and the associated reception of acknowledgments will preferably be implemented by a subroutine in base communication station 12 called the downlink manager. The downlink batch routine will receive the following information:

1. Electronic display unit's 10 identification number.
2. The content of the message.
3. The number of messages in the downlink batch.
4. Desired receive antenna mode (scan, selective, omnidirectional).
5. If selective antenna mode is used, then the list of enabled antennas for each base communication station 12 is included.

The downlink manager maintains a queue for each of the 15 communication frames within a super frame. (Remember: Frame 0 is typically used for the system information burst.) The queues preferably operate using a first in, first out (FIFO) discipline. The downlink manager responds to queries about the length of each queue. When a request for a downlink batch is received, the downlink manager performs the following actions to enter messages in a queue:

1. Check that the number of downlinks corresponds to either the small batch or the large batch. If not, it will return an error message that reports the batch sizes.
2. Attempt to assign the message to the frame queue with the appropriate batch size having the shortest length. With two queues of equal length, the downlink manager should assign the message to the queue to be transmitted sooner. The downlink manager checks that this assignment will not cause two batches of communication to the same electronic display unit 10 to overlap. Electronic display unit 10 cannot receive a message from one batch while it is receiving or acknowledging a message from a different batch. If an overlap would occur, the downlink manager should take appropriate remedial action.

For each downlink frame, the downlink manager instructs the base communication station 12 as follows:

1. If the time of day (TOD) code modulo for the batch size appropriate to that frame does not equal one, it will retransmit the message transmitted in that frame the last super frame.
2. If the time of day (TOD) code modulo for the batch size appropriate to that frame is equal to one, the downlink manager will take the next message off the front of the queue for that frame and transmit it. It will also generate appropriate antenna switch instructions for base communication station 12. If there are no messages on the queue, it will construct an appropriate dummy message and transmit that.

For every uplink time slot the downlink manager will record the acknowledgment data received at base communication station 12. If the time of day (TOD) code modulo for the batch size is one, then the downlink manager will complete the pending request and return all the acknowledgment information to the calling program. If a dummy message was involved, the downlink manager will add the acknowledgment information to the noise data base. It is noted that the above identified signals may be scrambled by a random number generator for transmittal.

In a preferred embodiment of the present invention, a subroutine in base communication station 12 supports automatic measurement of the downlink success ratio (DSR) associated with a particular electronic display unit 10 and location. This routine will be given an electronic display unit 10 identification number, a requested confidence interval, and an indication of how recently electronic display unit 10 was moved. The routine will initiate downlink measurements and/or utilize information from a history file and then return a measured downlink success ratio (DSR). This procedure compares the average acknowledgment level from large downlink batches with the average acknowledgment level from unpooled downlinks with a batch size equal to 1. The downlink success ratio (DSR) for a particular electronic display unit 10 at a particular location can be estimated using the following formula:

Experimental determination of downlink success ratio (DSR) using pooling, where:

$x_{sm}$—Sample average acknowledgment level without downlink pooling $\mu_s$—Theoretical average acknowledgment level from a given electronic display unit 10

$\mu_n$—Theoretical average noise level $$x_{sm} = DSR \cdot \mu_s + (1-DSR) \cdot \mu_n$$

solved for DSR:

$$DSR = \frac{(x_{sm} - \mu_n)}{(\mu_s - \mu_n)} = \text{Downlink success ratio (DSR)}$$

for example, when:

$$\mu_n=28; \mu_s=32; x_{sm}=30$$

$$DSR = \frac{(x_{sm} - \mu_n)}{(\mu_s - \mu_n)} = \text{Downlink Success Ratio (DSR)} = 0.5$$

For electronic display units 10 with an uplink signal sufficiently above the noise level, the downlink success ratio (DSR) can be estimated by the simpler method of counting all uplinks above the midpoint between the average signal level and the average noise level as successes and those below as failures.

Uplink pooling allows base communication station 12 to detect the acknowledgment of weak electronic display units 10 with a high degree of confidence. This high degree of confidence can also be expressed as a desired level of reliability or degree of certainty. The value of uplink pooling can be understood intuitively as follows. A weak electronic display unit 10 will cause base communication station 12 to detect a higher energy level at the acknowledgment frequency than it otherwise would. However, since the noise level varies, this level may only exceed the distribution of noise levels 90% of the time. If multiple uplinks are grouped together and 90% levels are achieved 5 out of 5 tries, the possibility of this being due to noise is only 1 in 10,000. In considering the possibility of extremely weak electronic display units 10, even if the signal to noise ratio for a weak electronic display unit 10 is 0 dB, the sum of the signal plus noise will average 3 dB above the noise level. The following processes are preferably performed to implement uplink pooling:

1. Information about the distribution of signal noise levels should be collected and analyzed by the base communication station 12 or systems engineers.
2. Hypothesis tests should be constructed and thresholds determined.
3. A choice of the appropriate downlink batch size is made.
4. Messages are sent and a hypothesis test is conducted to obtain an acknowledgment.

The base communication station 12 collects and analyzes information about the level and distribution of signal noise. A fundamental assumption behind detection of an uplink signal in the electronic display system is that base communication station 12 can measure a signal level which is the energy present at a frequency band in which an uplink may have occurred and can determine with sufficient confidence that such a level could not have been due to noise. To facilitate this determination, base communication station 12 should have sufficient information to be able to determine for any particular measurement that the likelihood that a particular signal level occurs based on noise alone. To determine this likelihood, the base communication station 12 collects three different data inputs as discussed in further detail below.

The signal noise level is a measurement of the signal level at a time when it is certain that an uplink signal is not present, such as after sending dummy messages. One advantage of this measurement is that it is, by definition, identical in terms of the frequency measured and the measurement techniques to the actual signal level. However, one disadvantage is that the measurement cannot be made at the same time as a real uplink. Because noise levels may change rapidly with time based on both base communication station 12, as well as any potentially interfering transmitters frequency hopping, the past signal noise levels cannot be relied on to provide sufficient information to predict possible signal levels due to noise for a particular uplink signal. The potential time variation problem is compounded by statistical variations in the signal noise level, which leads to the need for multiple samples in order to predict the probability distribution. However, measuring the signal noise level has been found to be a good way to calibrate and/or check and verify the validity of other estimates of noise and to predict the distribution of signal levels due to noise given other information about the noise level.

The noise level is a measurement of energy at a different frequency with the same bandwidth and similar frequency processing as the signal noise level. This measurement should not be affected by the presence of an uplink at the uplink frequency. This measurement has the advantage of providing a noise estimate about the particular uplink frame being considered and of providing a number of samples in a relatively short period of time while uplink activity is occurring. However, because it is narrow band, it will have significant random variations similar to the signal noise level and independent of the actual noise level. Experimental results without frequency hopping in a non-interference environment show that the statistical parameters and distribution of the noise level track the signal noise level well. A sample of at least 100 noise level measurements is preferably used to compute the likelihood of particular signal levels occurring due to noise. If necessary, populations of noise levels will be gathered for each hop frequency. Performance may be further enhanced by using a broad band noise level.

The broad band noise level measures the noise over a broad bandwidth. One advantage of a broad band noise measurement is that this measurement has less statistical variation from sample to sample. Therefore, based on one sample, base communication station 12 will have an accurate estimate of the average noise measurement. Prior to computing a broadband noise estimate, the effects of any 1/F noise and 60 Hz harmonics which will not affect the narrow band noise should be filtered out. The signal noise level distribution will be predicted from the broad band noise based on fitting experimental data and/or theoretical models. Theory predicts that the noise level in band-limited Gaussian noise will be $\chi^2$ distributed with degrees of freedom of 2×Bandwidth×Time.

The statistical techniques used in uplink pooling depend on verifying the independence assumption. Software in the display system should experimentally verify that each sample of signal noise relative to the broad band noise level or the average of the noise level is an independent random variable. It should not be auto-correlated in time or correlated with hop frequency. If necessary, remedial actions may be taken to either eliminate sources of correlation or identify separate populations and use statistics appropriate for those particular populations.

These statistical techniques are potentially sensitive to impulsive noise phenomenon, which often occur in engineering applications. Even though the signal noise levels may apparently closely follow a particular distribution, it is difficult to draw conclusions about values on the tail of a distribution. All signal noise level and noise level samples that are above the 98th percentile based on the probability distribution used in the analysis should be recorded with their time of occurrence and associated broad band noise measurement. These samples are called outliers. It will be most convenient if the list of outliers is sorted by noise level value and the total number of valid samples from which the list was drawn is maintained. If the broad band noise measurement is subject to significant variation, the percentiles and records will be different for each group of broad band noise measurements. It is possible that the broad band noise level may fall into two distinct categories of normal and high. Normal levels would show only statistical variations and possible time dependent shifts over the course of several hours or days. High levels would result from interference and may be high enough as to exclude uplink communication during particular time periods. In this case, the best approach has been found to discard all samples with high noise levels and not use them for uplink purposes.

As discussed previously, hypothesis testing involves testing a sample against information about the population distribution from which it is drawn and determining the likelihood that a given hypothesis is true (or should be accepted). Well-known statistical techniques involve determining a null hypothesis and alternative hypothesis, planning an experiment to use a given sample size choosing a statistic, for example the average, and a threshold for that statistic, gathering the data, computing the statistic and rejecting or not rejecting the null hypothesis. Because these techniques are well-known and analytically traceable, they are useful for projecting worst case performance.

Given the nature of the electronic display system in accordance with the present invention, it is more efficient and algorithmically simpler from a decision making point of view to use techniques of sequential analysis. In sequential analysis, the experiment is repeated until either one of two hypotheses has been concluded. While precise values for constructing sequential hypothesis tests are analytically difficult to calculate, good results can be obtained by calculating and using worst case bounds. In a sequential analysis, the ratio between the relative likelihood of each independent sample based on both hypotheses is determined. For the electronic display system in accordance with the present invention, each sample would be analyzed as shown below:

$$pr_i = \frac{p(\text{signal} \geq \text{min\_uplink\_signal})}{p(\text{signal\_is\_based\_on\_noise})}$$

The running product of all $pr_i$ from a batch is compared until it is greater than a high threshold and therefore demonstrates a valid uplink or it is less than a low threshold and therefore demonstrates that there is no uplink or that the uplink is below a minimum level.

The probability that the signal exceeds the minimum signal level will be computed assuming that signal levels are normally distributed in dB around the minimum level with a standard deviation determined by pooling individual electronic display units 10. Based on initial determinations, this standard deviation should be on the order of 4 to 6 dB.

The probability that the sample is based on noise may be estimated one of two ways: using a statistical distribution or using a history file. The most direct, but most difficult, way is to have a large number of samples of signal noise levels or noise levels all of which were taken under conditions equivalent to the current samples. The probability the signal is based on noise is given by the following equation:

$$p(\text{signal\_is\_based\_on\_noise}) = \frac{\text{number\_of\_noise\_samples} \geq \text{sample}}{\text{total\_number\_of\_noise\_samples}}$$

With approximately 2000 noise samples, the above equation will begin to have significant statistical uncertainties above the 98th percentile. To take the worst case of these uncertainties these values are calculated as follows:

Let N=number of noise samples≧sample
for N≧5

$$p(\text{signal\_based\_on\_noise}) = \frac{N + 2.6 \cdot \sqrt{N}}{\text{total\_number\_of\_noise\_samples}}$$

for N<5

$$p(\text{signal\_based\_on\_noise}) = \frac{N + 5.8}{\text{total\_number\_of\_noise\_samples}}$$

An alternative method is to fit a probability distribution function to the noise data. The choice of function should be supported by both theoretical and experimental data over a variety of conditions. For the electronic display system in accordance with the present invention, a normal distribution in dB is used as an approximation to what may be a Rayliegh distribution. If the in-phase and quadrature channel data were separated, the distribution may be $\chi^2$ with approximately 3.25 degrees of freedom. This can be verified experimentally. Because implosive noise may occur which is not covered by the physical properties underlining the majority of points in the distribution, the probability of samples above the 98th percentile should be computed based on actual data points and the equations above. It may be possible to determine a particular percentile to be used instead of experimental data.

Computationally, the most convenient approach is to evaluate for each sample the log of the probability ratio as shown by the following equation:

$$LPR_i = \log\left(\frac{p(\text{signal} \geq \text{min\_uplink\_signal})}{p(\text{signal\_is\_based\_on\_noise})}\right)$$

For each message, the cumulative sum of $LPR_i$ is computed after every sample. This sum is then compared against a threshold and one of these four decisions are made:
1. An acknowledgment has been received and therefore the message has been delivered.
2. Electronic display unit 10 is not acknowledging due to shadowing or a broken electronic display unit 10. Transmission will be attempted several hours or any other predetermined interval of time later.
3. There is insufficient data for a reliable conclusion and additional downlink batches are required.
4. Too many trial were performed, i.e., more than 80, and the operation should be terminated with an assumption of non-acknowledgment. (This should be a rare occurrence.)

As an example, the following equation calculates the log of the probability ratio for the electronic display system in accordance with the present invention for cases where the signal is below the 98th percentile noise level. In this example, x is a signal level value from the digital signal processor, $\mu_H$ is the minimum average signal level, $\mu_n$ is the average noise level, $\sigma_H$ is the estimated standard deviation of all display unit acknowledgments, and $\sigma_n$ is the noise standard deviation. Cnorm is a function that returns the area between its argument and—∞ under a standard normal curve. As stated above, alternative distributions may be more appropriate for other embodiments of the system in which case cnorm would be replaced by a more appropriate distribution function.

$$LPR(x) = \log\left[\frac{cnorm\left(\frac{x - \mu_H}{\sigma_H}\right)}{cnorm\left(\frac{\mu_n - x}{\sigma_n}\right)}\right] = \text{Log probability ratio function}$$

Three parameters are used to set up a sequential hypothesis test: a false positive rate, a false negative rate and a minimum signal level. The false positive and false negative rates are familiar concepts from basic statistics. The minimum signal level is an extra parameter needed for sequential analysis. Based on these parameters, decision thresholds are calculated.

The false positive rate for each type of communication is derived from customer requirements and will vary depending on the type of transaction. For example, a price change message will typically require greater confidence than self test or bed check messages. For interim internal stages, the required level of confidence or level of reliability may be a matter of convenience. For example, each message in a multi-message update may be sent with an α of 1 in 200 but the set of messages may then be verified by a single self test message with an α of 1 in 80,000 to meet customer requirements.

In deriving α from system requirements, it may be prudent to use the conservative allowance that every price change message will fail the first time and therefore use 1 in the number of messages per year. This assumption is robust and allows the system to retry many times. Provided the average number of transmission attempts per message does not exceed two, the false positive rate will not exceed specification. This means communication attempts should have at least a 50% probability of success.

A customer-driven false negative rate is typically specified. Because of shadowing by pallets of goods or parked shopping carts, electronic display unit 10 may be out of communication for several hours. To compensate for this, after a communication attempt fails, base communication station 12 will wait several hours or any predetermined interval of time and try again. The false negative rate (β) for pooling applies to a single attempt only. Making β too small will cause electronic display system to use more messages to determine that electronic display unit 10 is shadowed. Electronic display system will probably perform best if β is less than the shadowing probability of the weaker electronic display units 10. In the preferred embodiment of the electronic display system in accordance with the present invention, a β of 5% has been assumed.

The sum of β and the shadowing rate, and downlink batch failures, must be less than 50% for all electronic display units 10 to preserve the false negative rate given the choice of α above. After an upper bound on long term shadowing rates has been established by field experiments, β is chosen by systems engineers and the number of delayed retries needed to meet the customer requirements for false broken electronic display units 10 reports can be calculated.

The number of false broken electronic display units 10 reports allowed per customer level message is given by the following equation:

$$\beta_m = \frac{1}{30 \cdot 15{,}000}$$

SP=0.1=Shadow probability (assumed)
β=0.05=Hypothesis test false positive
DF=0.05=Uplink batches that fail due to a downlink batch failure (assumed)
BFP=1−(1−SP)·(1−β)·(1−DF)
BFP=0.188=Probability of uplink batch failure from all causes
Allowed long term recalls are determined by the following equation:

$$ALR = ceil\left(\frac{\log(\beta_m)}{\log(BFP)}\right)_{ALR=8}$$

where ceil rounds up to the next integer

Based on the α and β chosen above, the two important decision thresholds (A and B) are defined as follows. If the cumulative test statistic log of the probability ratio (LPR) exceeds the log of A, then the signal level is sufficient to conclude that an acknowledgment occurred. If the cumulative test statistic log of the probability ratio (LPR) is less than the log of B, then base communication station 12 will conclude that an uplink was not received. The formulas given for calculating A and B are shown below:

$$A(\alpha, \beta) = \frac{1-\beta}{\alpha}$$

$$B(\alpha, \beta) = \frac{\beta}{1-\alpha}$$

These equations calculate values of A and B that are sufficient to ensure that α and β are better than specified. This should mean that the electronic display system will exceed specifications and ensure customer satisfaction. It should be noted that because this assumes that a perfect uplink is achieved through downlink pooling and no shadowing, the actual communication attempt failure rate will exceed β. However, because of subsequent retransmissions, the customer will not see this.

The concept of a minimum level is important, since testing continues until one of the two hypotheses is proved. The test will not terminate if a minimum uplink level that exceeds the noise level is not established. If the minimum noise level is too high, weak electronic display units 10 will be unable to communicate. If it is too low, a large number of tries will be necessary before the electronic display system gives up on a particular electronic display unit 10 that may be shadowed. While setting this level at 2 dB above the noise has been found to be acceptable, a more optimal value may be set based on particular field data. If shadowing occurs often, it may be desirable to establish a minimum uplink level individually for each electronic display unit 10. It may be useful to take the greater of 2 dB or 33% of a well-established average signal strength for a particular electronic display unit 10. Before reporting that a particular electronic display unit 10 is broken, it is preferable for base communication station 12 to retry with the default minimum signal level. Independent of the choice of minimum signal level, the false positive acknowledgment rate will not exceed specifications.

Calculating the expected number of messages to complete communication is analytically difficult. It depends on the uplink signal to noise ratio, the distribution of both signal and noise, the downlink batch size and the downlink success rate. It is most preferably estimated by constructing a Monte Carlo simulation with the desired inputs and running it for a minimum of 1000 batches.

An estimate of the number of messages required assuming a perfect downlink can be obtained quickly with the formula below, however the accuracy associated with it is unknown.

$$\frac{\log(A(\alpha, \beta))}{LPR(\text{tag\_signal\_strength})}$$

A similar estimate of the number of messages required to conclude that a particular electronic display unit 10 is not acknowledging is:

$$\frac{\log(B(\alpha, \beta))}{LPR(\mu_n)}$$

The best known way to choose downlink batch sizes is to estimate the number of messages by simulation as noted above for both batches and then to compute the following ratio:

$$E_{small\_batch} = \frac{\text{Expected\_messages\_with\_large\_batch}}{\text{Expected\_messages\_with\_small\_batch}}$$

If this ratio is greater than one, use the small batch. If it is less than one, use the large batch. If this ratio results in a shortage of capacity for one batch size, switch batches for those situations closest to one. The assignment of a large number of electronic display units 10 contrary to efficiency may indicate a need to change the sizes of small batch and large batch.

If simulation results are unavailable, the downlink batch size can be selected based on setting a minimum downlink batch success rate. A 90% or better batch success rate is likely to provide good performance unless a large number of batches are needed. The batch size can be selected by using the following equation to estimate batch success rate (BSR) for the small batch:

$$BSR = 1-(1-DSR)^{Small\_batch\_size}$$

If the batch success rate (BSR) for the small batch is too low, use the large batch.

When a new electronic display system is initially turned on, it will broadcast dummy messages and gather noise background data for several minutes. When a new electronic display unit 10 is introduced into an electronic display system operating environment, base communication station 12 will initially send a change electronic display unit 10 identification number or self test message using the large batch. For periods when many new electronic display units 10 are being introduced, a small batch size of 1 and a large batch size of 16 is recommended. During the uplink, hypothesis testing on base communication station 12 is carried out until one of the signals demonstrates an acknowledgment with an α of 0.0001. In a system with multiple antennas, base communication station 12 may switch between antennas so that each antenna receives an equal share of uplinks. If more than one antenna is present, the system will designate the specific antenna on base communication station 12 with the strongest signal, i.e. the greatest Σ log of the probability ratio (LPR), as the primary one and the next strongest signals as the secondary and tertiary ones for that particular electronic display unit 10. Base communication station 12 should then attempt to use small batch for sending additional information to the particular electronic display unit 10 such as price information. Based on the success of attempts using small batch, base communication station 12 can estimate the downlink success rate (DSR) and decide if switching back to large batch is appropriate. Base communication station 12 can then communicate normally with that particular electronic display unit 10. If the antenna (or antennas in a multiple antenna system) cannot find the particular electronic display unit 10, the system should schedule a retry retransmission several hours or some predetermined time interval later. After a sufficient number of attempts to communicate have been completed with no successful acknowledgments, that particular electronic display unit 10 should be reported as broken.

Based on the history of performance of a particular electronic display unit 10 at a given location, i.e., with a particular preferred antenna, base communication station 12 estimates the downlink success rate (DSR) of a particular electronic display unit 10 and chooses an appropriate batch size. Base communications station 12 then sends the message to the particular electronic display unit 10 and waits until:

1. It has received an uplink with a confidence level appropriate for the message class; or
2. It concludes that the particular electronic display unit 10 is not acknowledging.

If it concludes the particular electronic display unit 10 is not acknowledging, it should:

1. Check the secondary and tertiary antennas for an acknowledgment signal. In some systems, these antennas will be associated with other base communication stations 12 and therefore will collect data simultaneously. When reusing the same data on an alternate antenna the value of α should be divided by 3.
2. Look at the sum of the log of the probability ratio (LPR) values from all successful messages since the identification number of the particular electronic display unit 10 was last changed. If this sum is less than twelve, it should also attempt to send the identification number command to the particular electronic display unit 10.
3. Schedule a communication attempt for several hours or a predetermined time interval later. After several attempts, the base communication station 12 should assume that the particular electronic display unit 10 has moved and follow the procedure described above for newly repositioned electronic display units 10. The base communication station 12 may reuse any available data from other antennas.

If a memory checking self test fails, base communication station 12 should reestablish communication by using a self test without the memory test. Once communication is reestablished, the memory test should be tried again immediately. Then if it again fails, base communication station 12 should reload the memory of the particular electronic display unit 10.

Figure 6:
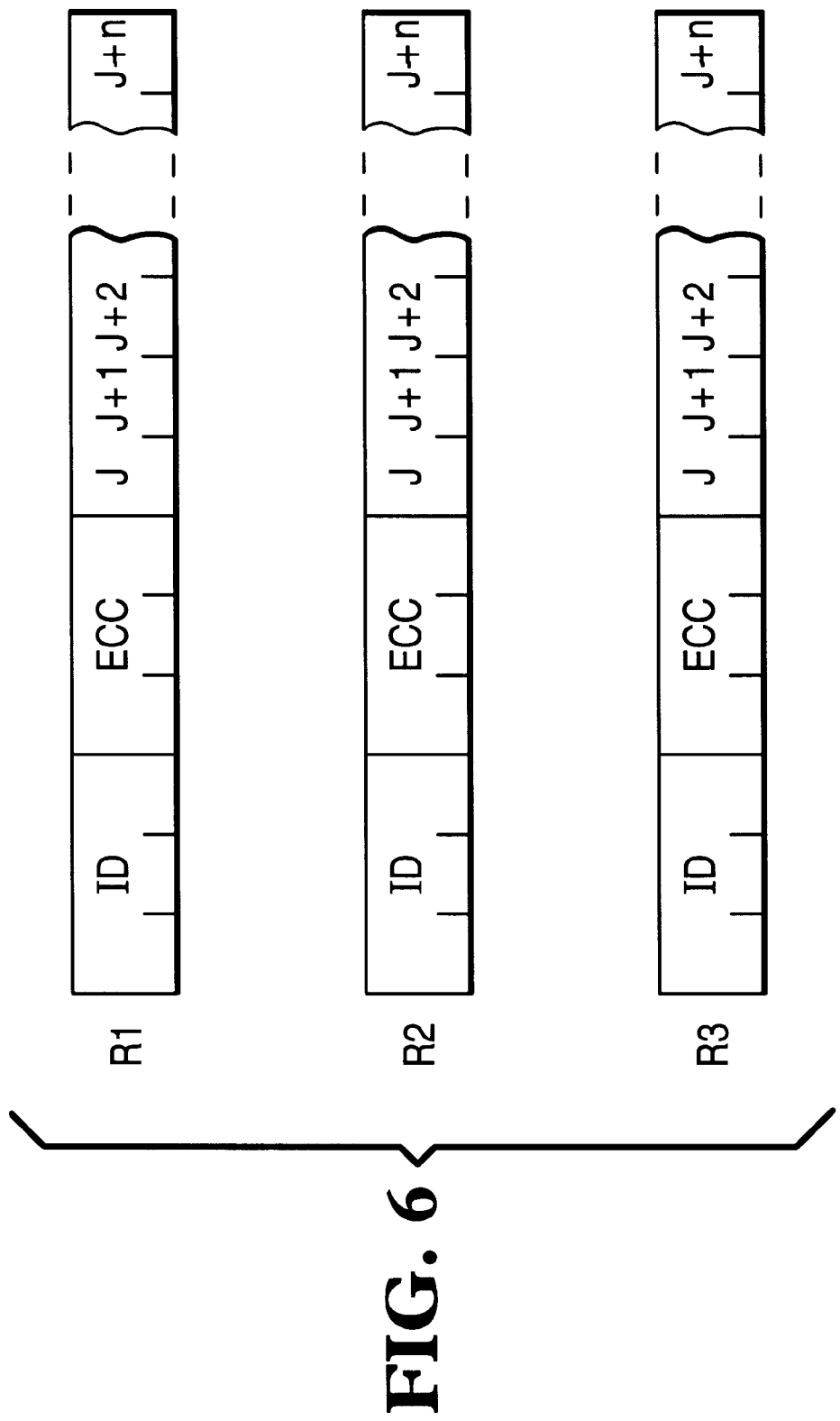
FIG. 6 is a block diagram showing the receipt of symbols according to the present invention.

The methods previously described can also be extended to the transmission of multi-symbol messages or packets as shown in FIG. 6. The receiver is provided with a means to accurately identify retransmissions of the same packet. FIG. 6 shows three receipts labeled R1, R2, and R3 of the retransmissions. Each receipt includes a means of identification which could use the type of protocol described hereinabove. Alternatively, the means of identification could include an ID (identification) field within the packet as indicated in FIG. 6. Also as shown in FIG. 6, a sufficient level of Forward Error Correction assures accurate transmission of the ID field. FIG. 6 also shows each individual symbol within a message designated as "J", "J+1", etc. The receiver for each symbol (J, J+1, . . . , J+n) received evaluates both the signal strength or signal to noise ratio associated with that symbol and that symbol's value. In some implementations, the strength and value are measured separately and in other implementations the strength and value are measured in a single measurement. Based on the value received, the receiver computes a log probability ratio of the symbol being any of the possible symbol values (using the techniques described above). The log probability ratios can then be combined using the techniques previously described. When all the symbols have been received with the desired degree of certainty or alternatively when an error checking code validates the packet, the transmission is complete. The packet can be acknowledged. Until the packet is acknowledged additional retransmissions could continue to help produce a correct received packet. The desired degree of certainty to indicate when the transmission is complete may vary depending on whether the message is classified as a high importance signal requiring a higher degree of certainty. Although FIG. 6 shows three receipts or three sets of received symbols, the number of receipts varies corresponding to the number of multiple identical messages sent.

Although the hereinbefore described method for evaluating the background noise relies on known statistical methods it is believed that the application of such methods in a wireless communication system such as electronic display systems is novel.

Although the present invention has been described above in detail, such explanation is by way of example only, and is not to be taken as a limitation on the present invention. Although the present invention has been described above in a system including messages and acknowledgments, the present invention may be used in a system not requiring acknowledgments. In such a system, the receiving unit may measure the signal strengths of multiple identical received messages and determine with a desired level of reliability that a message was received if the plurality of measured signal strengths is a predetermined level above a background noise value where the predetermined level is determined by a desired false positive rate which could not be met if only one message was received by the receiving station. Although the wireless communication system has been described as using radio frequency techniques, the system could alternatively use infrared, optical, magnetic or acoustic techniques in accordance with the present invention. The base and satellite units could each have independent signal sources or reflected signals. The communication protocol described may be altered or an entirely different communication scheme may be used with the present invention. Additionally, electronic display systems in accordance with the present invention could be used in various environments other than retail stores, for example in warehouses and distribution centers for identifying inventory information. The communication system of the present invention could be used with cellular phone, pager or other communication systems, particularly those having expensive base stations and many comparatively cheaper satellite stations, especially satellite stations with limited power capabilities for sending messages to the base station. Accordingly, the scope and content of the present invention are to be limited and defined only by the terms of the appended claims.

What is claimed is:

1. A method of transmitting and receiving a plurality of symbols within a message in a wireless communication system, comprising the steps of:

transmitting multiple identical messages containing a plurality of symbols to at least one receiver;

receiving said multiple identical messages having a plurality of received symbols at said at least one receiver;

determining the signal to noise ratio of each of said plurality of received symbols contained in said multiple identical messages; and determining a probability that each of said plurality of received symbols has a particular value based on the signal to noise ratio of each of said plurality of received symbols in said multiple identical messages.

2. The method in accordance with claim 1 further including the step of:

retransmitting said identical messages until the probability that each of said plurality of received symbols in said identical messages has a particular value is above a predetermined level.

3. The method in accordance with claim 2 wherein said predetermined level varies based on a classification of said identical messages.

4. The method in accordance with claim 1 further including the step of:

retransmitting said identical messages until each of said plurality of received symbols corresponds to possible symbol values included in an error checking code.

* * * * *